(12) United States Patent
Pardo et al.

(10) Patent No.: US 7,674,495 B2
(45) Date of Patent: Mar. 9, 2010

(54) METHOD AND DEVICE FOR MAKING A COMPOSITE PLATE

(75) Inventors: Philippe Pardo, Bassens (FR); Dominique Loubinoux, La Motte Servolex (FR); Alain Curie, La Motte Servolex (FR)

(73) Assignee: OCV Intellectual Capital, LLC DE (US)

( * ) Notice: Subject to any disclaimer, the term of this patent is extended or adjusted under 35 U.S.C. 154(b) by 483 days.

(21) Appl. No.: 10/538,357

(22) PCT Filed: Dec. 10, 2003

(86) PCT No.: PCT/FR03/03648

§ 371 (c)(1),
(2), (4) Date: Oct. 20, 2005

(87) PCT Pub. No.: WO2004/062893

PCT Pub. Date: Jul. 29, 2004

(65) Prior Publication Data

US 2006/0234028 A1    Oct. 19, 2006

(30) Foreign Application Priority Data

Dec. 13, 2002   (FR) .................................. 02 16043

(51) Int. Cl.
*B05D 1/12* (2006.01)

(52) U.S. Cl. ........................ 427/202; 427/195; 427/370; 427/389.9

(58) Field of Classification Search ................. 427/195, 427/202, 370, 389.9
See application file for complete search history.

(56) References Cited

U.S. PATENT DOCUMENTS

| 3,328,383 | A | * | 6/1967 | Roscher et al. | .............. 264/115 |
| 4,496,415 | A | * | 1/1985 | Sprengling | .................. 156/283 |
| 4,734,321 | A | * | 3/1988 | Radvan et al. | ................. 442/76 |
| 6,022,436 | A | * | 2/2000 | Koslow et al. | .............. 156/191 |
| 6,998,155 | B2 | * | 2/2006 | Haggquist et al. | ........... 427/513 |

FOREIGN PATENT DOCUMENTS

| DE | 41 15 832 | | 11/1992 |
| EP | 0 410 678 | * | 7/1990 |
| EP | 410 678 | * | 7/1990 |
| EP | 0 410 678 | | 1/1991 |
| EP | 1 203 652 | | 5/2002 |
| WO | 90/14457 | * | 11/1990 |
| WO | 02/09930 | | 2/2002 |
| WO | 02/22346 | | 3/2002 |

* cited by examiner

*Primary Examiner*—Frederick J Parker
(74) *Attorney, Agent, or Firm*—James J. Dottavio; Kathryn W. Grant

(57) ABSTRACT

A process for manufacturing composite sheets includes steps of:
  continuously depositing a web of yarns, in the form of a mat of continuous yarns, a woven, a knit or an assembly of continuous non-interlaced yarns on a moving substrate;
  depositing a powder of an organic material capable of forming a coating layer under the action of heat on at least one side of said web;
  heating the web coated with the powder to a temperature sufficient to melt the powder;
  compressing and cooling the web so as to form a composite strip; and
  cutting the strip in the form of sheets or winding the strip up on a rotating support.

Figure 1:
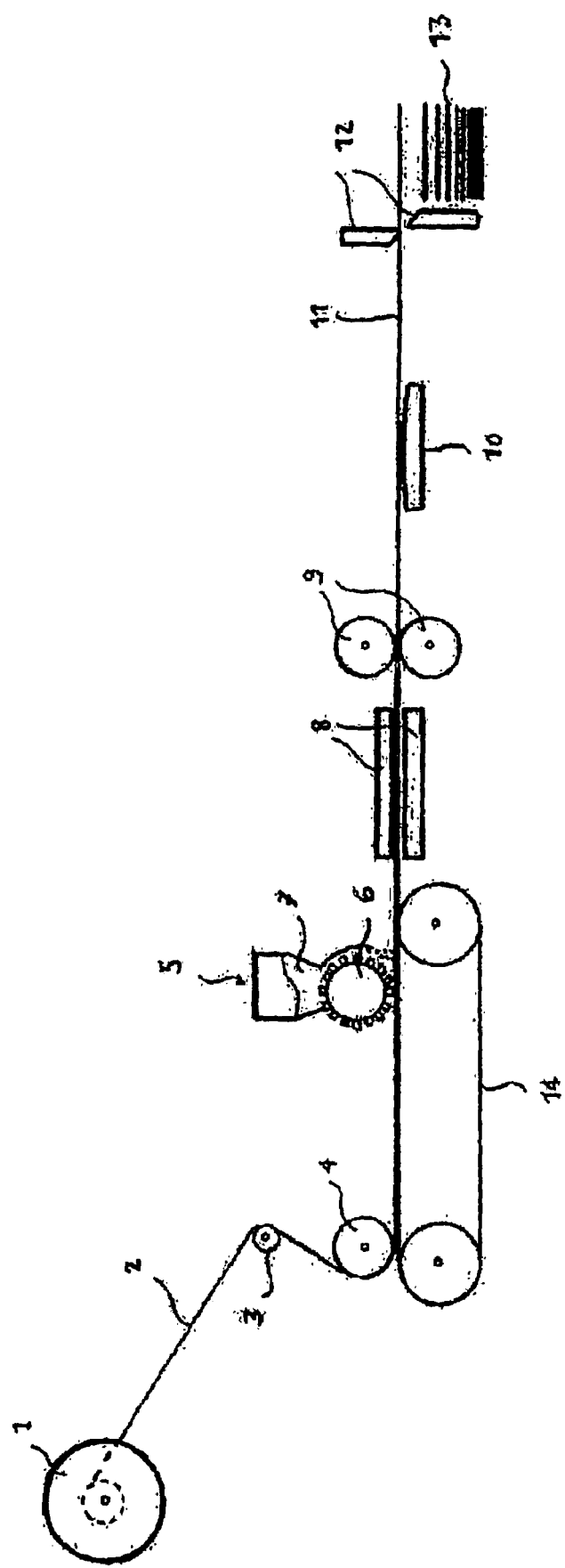

23 Claims, 2 Drawing Sheets

METHOD AND DEVICE FOR MAKING A COMPOSITE PLATE

This application is a 371(c) of PCT/FR03/03648, filed on Dec. 10, 2003, which claims priority to French application number 02/16043, filed on Dec. 13, 2002, the text of which is herein incorporated by reference.

The present invention relates to a process and to an installation for the continuous manufacture of a composite sheet comprising a thermoplastic or thermosetting matrix and reinforcing yarns, and a layer of a coating that improves the surface appearance, this sheet being more particularly intended for the production of panels for vehicles or containers for transporting or storing merchandise.

BACKGROUND OF THE INVENTION

More precisely, the invention relates to a process, and to the installation allowing its implementation, which consists in applying, to a web of yarns continuously deposited on a moving substrate, a powder of a material capable of reacting under the effect of heat in order to form a coating layer, said web comprising at least one organic, thermoplastic or thermosetting, material and at least one reinforcing material, and in heating and then compressing the assembly thus obtained in order to form a composite sheet.

The walls of trucks, trailers and containers used for transporting or storing merchandise are formed from panels generally consisting of a thermoplastic or thermosetting material into which reinforcing yarns, especially glass yarns, are incorporated, and of a topcoat whose function is to improve the appearance of the surface visible from the outside. The main purpose of the topcoat is to attenuate the "marking" effect due to the presence of the reinforcing yarns near the surface, in other words to make it smoother and possibly glossier. The esthetic appearance is not the only advantage provided by the coat: since the surface finish is improved, it becomes easier to apply patterns and inscriptions, for example by means of a paint or in the form of stickers, or to maintain the state of cleanliness thereof.

The walls of trucks, trailers and containers each consist of a one-piece panel of large dimensions, possibly up to 3.5 meters in width and 17 meters in length, or even more.

Several known methods are used to manufacture these panels.

A first method consists in forming a continuous strip from a matrix comprising reinforcing yarns, in coating this strip with a film capable of forming the coating layer and in cutting said strip to the required dimensions in order to form the final composite panel.

To obtain very wide panels requires the use of a film at least as wide as that of the panel. It is difficult and also very expensive to produce such films, as the production requires machines that are specially adapted to these large widths. The film may be obtained and deposited directly by extrusion at the time of manufacture of the panel or the film may be provided already wound in the form of reels. For widths greater than 2 meters, it is not conceivable to use extrusion since the cost of the machine is much too high.

With reels, there are additional problems associated with production (size of the reels, quality of the film), with storage and with the requirement to have a specific film for each type of panel, especially as regards the color. Conventionally, these drawbacks are alleviated by using several films of smaller width that are juxtaposed or partially overlapped at the edges in order to be matched to the size of the panel. However, the final panel is unsatisfactory as marks remain visible where the films are joined together.

Another method consists in cutting the strip from the abovementioned first method to the dimensions of the panel and then in applying the coating in paint form.

The nature of the material used does not allow correct bonding of the paint when it is applied directly. It is for this reason that it is generally recommended to pretreat the surface to be coated, for example by applying an adhesion primer or else to carry out a flame treatment ("flame brushing") or a corona treatment. It is general practice to apply a layer of a "lining" primer to the treated surface, said primer having the consistency of a mastic and serving to mask the surface irregularities. The coat of paint that forms the actual topcoat is applied to the primer, possibly after a rubbing-down step.

Although this method allows great freedom in the choice of color, it also has drawbacks. Its implementation requires a painting booth capable of taking large panels, and also having to be equipped with means for the completely safe use of paints based on organic solvents that are undesirable both for users and for the environment, and for keeping the panels free of dust.

The above process is a discontinuous process in which each panel is treated individually in a relatively long treatment cycle: to give an example, with the adhesion primer, several hours of drying are needed before the next layers can be applied.

It is an object of the present invention to provide a process that allows rapid and continuous manufacture of composite sheets which have a coating improving the surface appearance and are of large dimensions, especially a large width.

It is also an object of the present invention to provide a process in which the coating is formed on the composite sheet by applying a powder.

SUMMARY OF THE INVENTION

These objects are achieved thanks to the process according to the invention, which comprises at least the following steps:

a web of yarns, in the form of a mat of continuous yarns, a woven, a knit or an assembly of continuous non-interlaced yarns, is continuously deposited on a moving substrate, this web comprising at least one organic material and at least one reinforcing material;

a powder of an organic material capable of forming a coating layer under the action of heat is deposited on at least one side of said web;

the web coated with the powder is heated to a temperature sufficient to melt the powder;

the web is compressed and cooled so as to form a composite strip; and the strip is cut in the form of sheets or wound up on a rotating support.

The web of yarns is formed from at least one organic, thermoplastic or thermosetting, material forming the matrix and from at least one material capable of reinforcing said matrix.

As material that can form the matrix, mention may be made of thermoplastics such as polyolefins, for example polyethylene and polypropylene, polyesters, for example polyethylene terephthalate (PET) and polybutylene terephthalate (PBT), polyamides, for example nylon-6, nylon-6,6, nylon-11 or nylon-12, polyvinyl chloride (PVC) or acrylic homopolymers or copolymers, and of thermostats, such as epoxy resins, unsaturated polyester resins, polyvinyl esters or phenolic resins.

The reinforcing material may be any type of material that can be obtained in the form of yarns, for example glass, carbon or aramid.

In general, the web is formed from a reinforcing material, advantageously glass, and from one or possibly several thermoplastic organic materials, advantageously polyethylene, polypropylene, a polyester (PET or PBT) or a polyamide, or a thermoset, advantageously an epoxy resin, an unsaturated polyester resin, a polyvinyl ester or a phenolic resin. Preferably, the web consists of glass and one or more thermoplastic organic materials.

The web generally comprises between 20 and 90% by weight of reinforcing material, preferably in glass form, preferably between 30 and 85% and particularly preferably between 40 and 80% by weight of reinforcing material. It may consist completely or partly of yarns of thermoplastic material and yarns of reinforcing material, these yarns preferably being arranged alternately in the web and advantageously being intimately mixed. The web may also include hybrid yarns obtained by joining together and simultaneously winding yarns or filaments of one of the thermoplastic organic materials and of the reinforcing materials, these hybrid yarns possibly being mixed with yarns consisting solely of one thermoplastic organic material and/or one reinforcing material. The web may also consist completely or partly of yarns of reinforcing material coated with thermosetting organic material.

Preferably, the web comprises at least 50%, advantageously at least 80% and preferably 100% by weight of intermingled yarns.

The term "intermingled yarns" is understood to mean here yarns composed of glass filaments and filaments of a thermoplastic organic material which are intimately intermingled. These yarns may be obtained by mechanical means, described for example in patent U.S. Pat. No. 4,818,318. Under the conditions of that patent, the reinforcing yarns and the thermoplastic yarns are paid out from their respective packages and then the filaments constituting them are separated in the form of two webs of the same width. These webs are then brought into contact with each other to form only a single web, while alternating as regularly as possible the two kinds of filaments, and then the intermingled filaments are combined into a single yarn.

The term "intermingled yarns" should also be understood to mean yarns that are obtained directly during manufacture of the thermoplastic organic filaments and the glass filaments, for example as described in EP-A-0 599 695 and EP-A-0 616 055. The filaments obtained by melt extrusion and mechanical drawing of a thermoplastic organic material are thus drawn in the form of a web and are intermingled with a bundle or a web of glass filaments (or are thrown into said bundle or said web), said glass filaments also undergoing drawing. These yarns are preferred as the distribution of the filaments is more uniform than in the intermingled yarns obtained in another manner.

According to the invention, the web of yarns is in the form of a mat of continuous yarns, a woven, a knit or an assembly of continuous non-interlaced yarns, for example a mesh or a weft-insertion warp knit. The web may comprise one or more of the abovementioned structures based on continuous organized yarns, lying in directions that may vary widely, it being possible furthermore for these structures to be bonded together by various methods, for example by needle bonding, stitching-knitting by means of a binding or bonding yarn. According to a preferred embodiment, the web is exclusively in the form of at least one woven and/or knit and/or assembly of continuous non-interlaced yarns, at least partly formed from intermingled yarns.

The wovens falling within the scope of the invention comprise intermingled yarns that may be warp or weft yarns, preferably both at the same time.

The web of yarns moving at a speed of, for example, between 0.5 and 10 m/min passes through a device allowing the coating material in powder form to be applied. Any known device allowing a uniform distribution of the powder to be obtained can be used. In particular, the web may be made to pass through a bed of powder, the height of which at the exit is adjusted by means of a doctor blade allowing a constant thickness of powder to be deposited. It is also possible to use a powder coating device comprising one or more rolls provided with grooves or with nips, or an electrostatic device operating by spraying the powder onto the web, the powder particles being retained on the surface owing to the difference in electric potential difference. When the powder coating operation relates to the underside of the web, it is necessary to combine the electrostatic device with a means for heating the powder before it is sprayed, so that the particles adhere to the web and do not subsequently fall off by gravity.

The thickness of the powder layer is adjusted so as to obtain a coating on the final composite strip having a thickness of between 0.3 and 1 mm, preferably between 0.5 and 0.8 mm.

In general, the powder consists of particles of thermoplastic or thermosetting material, preferably having a high film-forming capability. Also preferably, the powder gives the final coating an opacity sufficient to make the reinforcing filaments in the matrix invisible.

The thermoplastic material may be chosen from polyolefins, in the form of homopolymers such as polyethylene or polypropylene, or in the form of copolymers, polyamides, polyesters and PVC.

The thermosetting material is selected from epoxies, polyesters, polyurethanes and phenolic compounds.

Preferably, when the powder is applied directly to the web, without intermediate structure as is indicated later, it is of the same nature as the matrix.

The powder may furthermore include additives, such as color pigments, UV stabilizers, anti-graffiti agents, agents for improving impact (stone-chip) resistance and scratch resistance, antifouling agents and fire retardants.

The total content of additives is generally less than 30%, and preferably less than 10%, of the total weight of the powder.

The powder-coated web of yarns then passes through a zone in which it is heated to a temperature high enough to allow the web of yarns to be converted into a matrix within which the reinforcing yarns are embedded and to melt the powder into a coating film.

To be high enough, the temperature must be above the melting temperature of the organic material having the highest melting point. Additionally, the temperature must remain below the degradation temperature of the material having the lowest melting point. Within the context of the invention, the degradation temperature is the temperature at which the material starts to deteriorate—this deterioration may be manifested by decomposition (ignition), loss of integrity (creep) and/or color change (yellowing).

As an example, the heating temperature may be around 100 to 300° C., especially around 200 to 220° C. when the web consists of glass and polypropylene and the coating is based on polypropylene.

The heating may be carried out in several ways, for example with the aid of an infrared-radiating device such as an oven, panels or lamps, with the aid of a device that blows hot air, such as a forced-convection oven, with the aid of a contact heating device, such as heated rolls, or else with the aid of a double-belt laminator. The heating may combine several of the aforementioned means.

In many cases, it is preferable for the heating step to be followed by a consolidation step, which consists in subjecting the assembly formed to compression in a suitable device, for example a two-roll calender. The force applied depends on the nature of the yarns of the web and on the rheology of the coating material—it may vary from 1 to 100 bar.

The pressure exerted in the compression device makes it possible to compact the web of yarns and make the coating layer uniform, especially by giving it a constant thickness, the structure obtained then being set by cooling.

The cooling may be carried out partly during the compression, for example by means of the rolls when maintained at a temperature below the solidification point of the lowest-melting-point material, for example between 10 and 130° C., preferably at a temperature below 80° C. and better still below 60° C.

The compression device may also consist of several calenders, especially when the thickness is large or if it is desired to have a high degree of flatness and/or a high production rate.

To prevent the coating from adhering to the walls of the rolls, it is preferable to cover them with a nonstick coating such as PTFE or to insert a material having nonstick properties between the powder-covered web and the rolls. This material may, for example, be a film of siliconized paper, whether or not to be used just once, or an endless belt of PTFE-coated cloth.

According to one embodiment, the compression device is in the form of a belt press, the belts being made, for example, of steel, glass cloth or aramid cloth, these preferably being coated with PTFE. Preferably, the press furthermore includes a hot zone upstream of the compression device, and a cold zone downstream, the heating or cooling elements being in the form of plates, bars or rolls (calenders).

As already indicated, the cooling may take place in the compression device or else it may be carried out independently of the compression, for example by natural or forced convection of cold air or by passage over a cooling table.

The sheet obtained on exiting the cooling zone may be wound up on a mandrel of suitable diameter depending on the thickness and the stiffness of the sheet, or it may be cut up by a cutting device, for example a guillotine or a circular saw.

The manufacture of the composite sheet may be carried out from a single web as described above, which corresponds to the simplest embodiment. However, it also falls within the scope of the present invention to be able to form a sheet by combining one or more other webs of yarns of materials and/or structures that differ from the previous web, for the purpose in particular of forming thicker sheets. In this case, the webs of yarns are preferably formed from wovens and/or knits and/or continuous non-interlaced yarns.

In general, it is possible to deposit, on at least one side of the web of yarns, before the powder is applied, other structures endowed with specific properties. These intermediate structures give the final composite sheet better characteristics, for example additional reinforcement, and fulfil several other functions.

Firstly, they constitute a means of reducing the "marking" effect of the yarns present on the surface of the reinforced matrix, by forming an additional layer whose thickness may be regulated according to the desired result.

These structures also help to improve the adhesion of the coating layer to the reinforced matrix—in certain cases, the adhesion can be effected by their agency alone.

Such structures also allow lightened composite sheets to be obtained.

Finally, they produce a "barrier" effect, especially by preventing interpenetration of the coating layer and the reinforced matrix in the final sheet, and also give said sheet fireproofing, waterproofing and thermal and/or acoustic insulation properties.

The structures are in various forms, namely yarns or yarn assemblies (meshes, wovens), films, veils, sheets, panels, foams, etc.

They may consist entirely or partly of polyethylene, polypropylene, polyester, such as polyethylene terephthalate (PET) and polybutylene terephthalate (PBT), polyamides, polyacrylics, polyurethane, polyester, glass or a metal, and include fillers (talc, calcium carbonate, balsa, wood, cork), adhesives and fire retardants.

The structures have a thickness that may vary widely depending on the material used—from 50 micrometers in the case of veils, films and sheets, to several centimeters, in the case of panels. Preferably, the thickness of the structures varies from 0.5 to 2 mm.

The present invention also relates to an installation for implementing the process, this installation comprising:
 a) at least one device for feeding at least one web of continuous yarns;
 b) at least one powder coating device;
 c) at least one device for heating the powder-coated web; and
 d) at least one device for compressing, and optionally cooling, the web.

The installation according to the invention may also include at least one cutting device and/or at least one collecting device for the composite sheet.

The sheets obtained by the process of the invention are inexpensive, as they are produced continuously. The are formed from a matrix, within which reinforcing filaments are embedded, protected by a coating forming a uniform topcoat, of attractive appearance, which may receive decorative patterns and inscriptions in the form of paint, varnish or stickers.

If the topcoat is of attractive appearance, especially a uniform, flat and smooth surface without a "emarking" effect, this is primarily because the reinforcing yarns are continuous and can be distributed so as to be approximately parallel to the plane of the web during the compression step. Such a level of performance is not achieved with chopped yarns, particularly short chopped yarns, as they all do not lie in the plane of the web under the compression effect, some of them retaining an orientation perpendicular to said plane. In the end, the surface of the sheet bristles with protuberances, in the form of small spikes, due to the yarns that protrude therefrom.

The sheets generally have a thickness of 1 to 10 mm, preferably 1 to 6 mm, are easy to cut and exhibit good mechanical properties, in particular good impact (stone-chip, hailstone) resistance. The sheets obtained are also rigid, but may have, where appropriate, sufficient flexibility to be able to be collected and stored in wound form. They may also be used for the thermoforming and molding of parts made of composites.

The composite sheet thus obtained may be used as such or be combined with other flexible or rigid products, especially in order to form sandwich panels having an improved strength/weight ratio. The rigid product may be in the form of wooden (balsa, chipboard) boards or of thermoplastic or thermosetting foam, or else have a cellular structure, for example of the honeycomb type, based on aluminum, paper or polypropylene. The manufacture of the panel is generally carried out by bonding the composite sheet to at least one side of the aforementioned structure by suitable means, preferably by adhesive bonding. The foam-based panels may be obtained from a sheet of foam cut to the desired dimensions, i.e. be extruded directly on the composite sheet and then calendered. The thickness of the panels may vary from 2 to 100 mm, preferably from 10 to 50 mm.

The composite sheets and the panels formed from these sheets are more particularly intended to form walls used in the transport field (truck bodies, trailers, caravans, camping cars) or the building field (cladding, lightweight construction partitions).

The composite sheets have the advantage of being able to be welded without external addition of material, and are capable of being molded, especially by thermoforming. Furthermore, it is easy to repair the coating when it has been damaged, simply by depositing the coating powder, optionally dispersed in a liquid or in mastic form, and then heating it. They may also be easily recycled in the form of granules or small pieces, for injection molding or compression molding.

BRIEF DESCRIPTION OF THE DRAWING FIGS.

Figure 2:
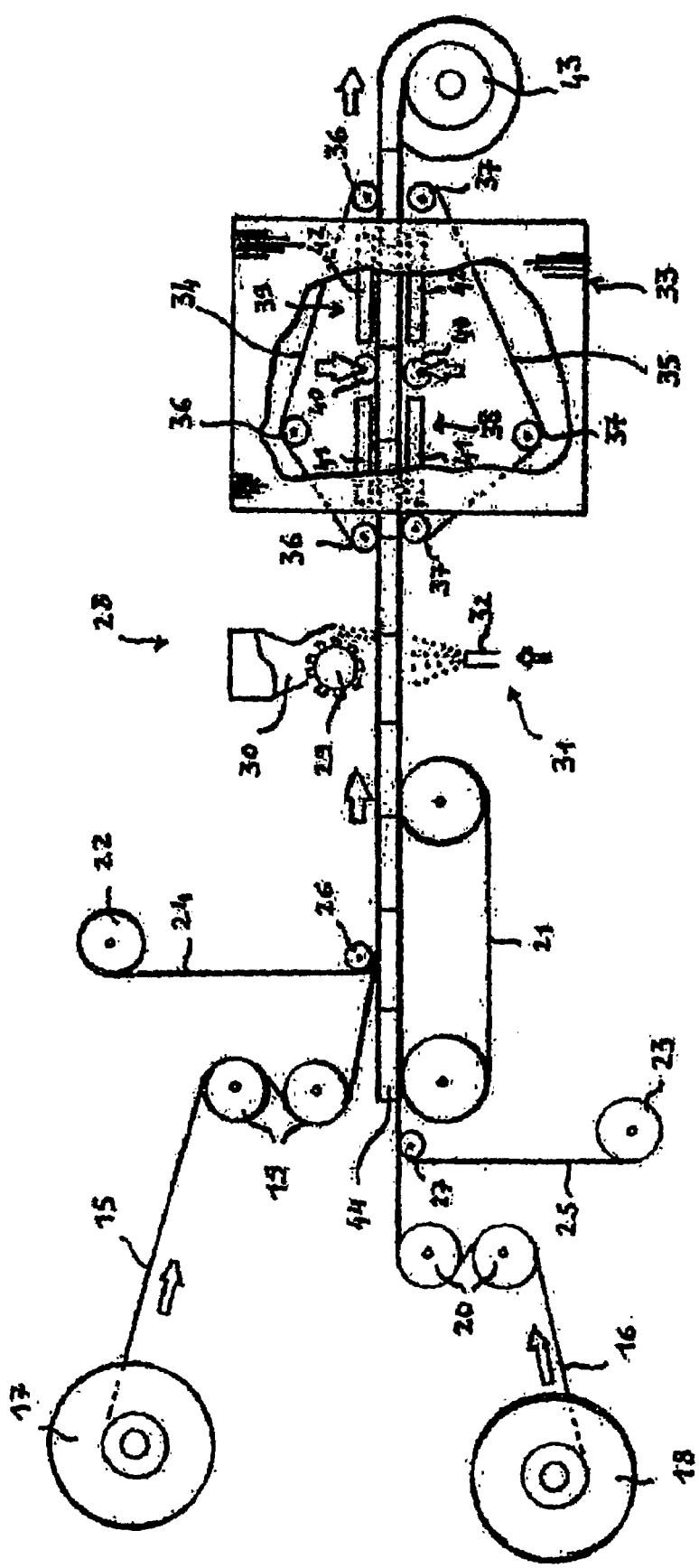

Other advantages are given in the following drawings that illustrate the invention:

FIG. 1 shows a schematic view of an installation for implementing the invention in its simplest embodiment; and FIG. 2 shows a schematic view of an installation for implementing the invention according to the preferred embodiment.

DETAILED DESCRIPTION OF THE INVENTION

FIG. 1 shows schematically a composite sheet production line which comprises, upstream, at least one reel (1) of a woven made from intermingled yarns. The woven (2) paid out from this reel passes over a turn roll (3) and a forwarding roll (4), allowing the tension in the web to be reduced, and then beneath a powder coating device (5) composed of a grooved roll (5) connected to the base of a reservoir (7) filled with the coating powder, which distributes the powder over the surface of the woven.

The powder-coated woven is then heated by infrared radiation panels (8), without being in contact with them, to a temperature high enough to melt the organic material contained in the yarns and the organic material of the powder.

The woven thus heated passes between press rolls (9) which compress the melted organic materials with a force of about 5 kN to 50 kN per meter of width, and then passes over a cooling table (10).

On leaving the table (10), the cooled, rigid, composite strip (11) is cut continuously to the desired dimensions, by the blades (12) of an automatic shear (not shown), into the form of sheets (13).

In a variant, the yarns are combined into tows that are continuously sprayed onto the conveyor belt by means of an air ejector (not shown) that moves transversely relative to said strip, in a reciprocating motion, in order to form a mat (or web of looped yarns).

FIG. 2 shows schematically an installation for manufacturing a composite sheet according to the preferred embodiment of the invention.

In this embodiment, two wovens (15, 16) of intermingled yarns are paid out from the reels (17, 18) and pass over forwarding rolls (19, 20) before coming together on the conveyor belt (21).

Installed downstream of the reels (17, 18) are two rolls (22, 23) of a surface veil. The veils (24, 25) paid out from the rolls are applied by means of the turn rolls (26, 27) to the wovens (15, 16).

A powder coating device (28), comprising a grooved roll (29) connected to a reservoir (30) containing the coating powder, is installed downstream of the conveyor belt (21) and above the woven/veils combination. According to a variant, a second powder coating device (31) may be installed beneath the combination, in order to apply the powder to the underside. This device is composed here of a nozzle (32) for spraying powder preheated by hot air.

The powder-coated woven/veils combination is introduced into a flat laminating press (33). This press essentially comprises two continuous belts (34, 35) moved by a set of rollers (36, 37), a heating zone (38), a water-circulation cooling zone (39) and press rolls (40) between which the combination is compressed and driven. In the first zone (38), the combination is heated by plates (41) to a temperature allowing the filaments of organic material and the powder to melt, the rolls (40) helping both to distribute the molten material uniformly within the combination and to compact the wovens (15, 16). In the second zone (39), the combination, cooled by the plates (42), is set and consolidated.

What is obtained at the exit of the press (33) is a rigid strip that is wound onto a mandrel (43). Each side of the strip has a uniform and smooth surface.

In a variant, it is possible to obtain thicker composite sheets by introducing either a structure comprising an organic matrix and reinforcing yarns, for example in the form of continuous or chopped yarns, one or more wovens, one or more knits or a composite sheet, for example of the same nature as the aforementioned strip, or a different structure, for example foam or cellular panels (44) deposited between the wovens (15, 16). The panels (44) are placed edge to edge on the conveyor belt (21).

When the thickness of the strip is large and does not allow it to be collected in the form of a reel, it is cut into panels, for example by a circular saw mounted on a follower carriage (not shown).

In another variant, the wovens (15, 16) are replaced with two strips (11) collected in the form of reels produced in the installation of FIG. 1.

The following examples illustrate the process according to the invention and the products obtained by this process.

EXAMPLE 1

The installation described in FIG. 1 was used to manufacture a composite sheet 1.5 m in width and 1.5 mm in thickness, consisting of 60% glass by weight and 40% polypropylene by weight.

Assemblies of continuous yarns, 750 g/m$^2$ in weight and 1.5 m in width, comprising, as warp and as weft, intermingled yarns formed from 1870-tex intermingled rovings containing 60% glass by weight and 40% polypropylene by weight, were used, the yarns being bound together in the weft direction by stitching-knitting with a polypropylene binding yarn.

Two assemblies coming from two reels were superposed on the conveyor belt and a powder of a polyolefin-based thermoplastic alloy (Plascoat® Talisman sold by Plascoat) was applied to the top side of the assembly in an amount of 500 g/m$^2$. The assembly, running at a speed of 1.5 m/minute, was heated between the infrared radiation panels (length: 1 m; temperature: 200° C.) and then passed between the rolls (diameter: 300 mm; temperature: 40° C.; nip: 1.5 mm) of the calender.

The composite sheet obtained had a thickness of 1.5 mm and the surface was coated with a uniform, white and glossy coating layer 0.5 mm in thickness.

EXAMPLE 2

The installation of FIG. 2 was used.

A "jet fluid"-bonded 70 g/m² polyester veil (reference NLC 10/701 sold by PGI) was deposited on two 745 g/m² wovens formed from 1870 tex intermingled rovings containing 60% glass by weight and 40% polypropylene by weight, bulk-colored black, in a 2×2 twill, 1.5 m in width, and the powder of thermoplastic alloy of example 1 was applied in an amount of 500 g/m². The assembly was introduced into a double belt press comprising a heated zone at 200° C., a two-roll calender (pressure: 1.5 bar (0.15 MPa)) and a cooling zone at 20° C. The press operated at a speed of 2 meters per minute.

A sheet 1.5 mm in thickness comprising a uniform glossy coating layer, white in color, was obtained.

EXAMPLE 3

The conditions of example 1 were used. A 50 g/m² glass veil was deposited on a 1485 g/m² woven formed from 1870 tex interminged rovings containing 60% glass by weight and 40% polypropylene by weight, in a 2×2 twill with sides of 1.5 m, and the powder of thermoplastic alloy of example 1 was applied in an amount of 500 g/m².

The assembly, running at a speed of 1.5 m/min, was heated between the infrared radiation panels (temperature: 220° C.) and then passed into the calender.

The composite sheet obtained had a thickness of 1.5 mm. It was cut up and heated to 220° C. for 1 minute in an infrared oven, it was then transferred into a press, consisting of a rectangular mold and a countermold regulated to 60° C., and subjected to a 40 bar (4 MPa) pressure for 1 minute.

After demolding, a box 150 mm in width, 200 mm in length and 20 mm in height, having a uniform coating and no material distribution defect, was obtained.

EXAMPLE 4

An installation as described in FIG. 2 was used to continuously form sandwich panels 1.5 m in width, 2.4 m in length and 22.5 mm in thickness, consisting of a polyurethane foam coated with composite sheets consisting of 60% glass by weight and 40% polypropylene by weight.

Polyurethane foam panels (length: 1.55 m; width: 1.2 m; thickness: 20 mm; density: 100 kg/m³; reference: SPF 100, sold by SAITEC) were juxtaposed on the conveyor.

During displacement, the panels were coated on their top side and underside with a 1485 tex, 4×4 twill woven, consisting of yarns of intermingled rovings consisting of 60% glass by weight and 40% polypropylene by weight, followed by a fluid-jet-bonded 70 g/m² polyester veil (NLC 10/701 sold by PGI).

The powder coating devices delivered 500 g/m² of thermoplastic powder (Plascoat® Talisman, sold by Plascoat) on each side of the assembly. The temperature of the powder sprayed onto the underside was about 180° C.

In the PTFE-coated glass-cloth belt press, the first zone had a length of 1 m and the temperature was about 210° C., the second zone 4 m in length was maintained at about 20° C. and the calender was composed of two rolls 400 mm in diameter, each bearing on the assembly with a force of 2 kN. The calender nip was 22 mm.

The composite panel was continuously output at a speed of 0.7 m/min and was then cut using a circular saw into panels 1.5 m in width and 2.4 m in length.

The composite strips coating each side of the panels had a void content of less than 3% and a uniform coating layer white in color.

EXAMPLE 5

The conditions were those of example 4, but modified in that the panels had a width of 2.9 m and a thickness of 80 mm, and a double steel belt press, comprising a heated zone 3 m in length and a cold zone of the same length, exerting a pressure of 2 bar (0.2 MPa) was used, with no calender between the two zones.

Composite panels 2.9 m in width, 12 m in length and 82.5 mm in thickness were thus formed.

EXAMPLE 6

The installation described in FIG. 2 was used to manufacture panels with a polypropylene cellular structure 2.9 m in width, 12 m in length and 52.5 mm in thickness, said panels being coated with composite sheets consisting of 60% glass by weight and 40% black bulk-colored polypropylene by weight.

The core structures consisted of honeycomb-type cellular panels made of polypropylene (length: 2.95 m; width: 1.2 m; thickness: 50 mm; density: 80 kg/m³) deposited in a contiguous manner on the conveyor.

During their displacement, the top side and underside were coated with a composite sheet obtained under the conditions of example 3.

The temperature of the hot first zone of the belt press was about 210° C., that of the second zone was about 20° C. and the calender, whose nip was 52 mm, exerted a pressure of 2 bar (0.2 MPa) on the assembly.

The composite panel was continuously output at a speed of 2 m/min and then was cut up into rectangles.

EXAMPLE 7

An installation as described in FIG. 2, which included a foam extrusion and calendering device located upstream of the conveyor, was used to continuously form a composite sheet 2.9 m in width and 16 mm in thickness, consisting of an expanded polypropylene foam reinforced with glass yarns and coated with composite sheets consisting of 60% glass by weight and 40% polypropylene by weight.

The core foam was formed in a sheet die (not shown) by extrusion from a polypropylene compound containing 10% by weight of chopped glass fibers less than 1 mm in length, said foam being deposited on the conveyor. At the die exit, the foam had a thickness of 14 mm, a width of 2.95 m and a density of 300 kg/m³.

The top side and underside of the foam were coated downstream with a 1485 g/m² woven of intermingled rovings containing 60% glass by weight and 40% polypropylene by weight, in a 4×4 twill, and then with a fluid-jet-bonded 70 g/m² polyester veil (NLC 10 sold by PGI).

The powder coating devices delivered 600 g/m² of thermoplastic powder (Plascoat® PPA 571 HES sold by Plascoat) onto each side of the assembly. The temperature of the powder sprayed onto the underside was about 160° C.

The press was a steel belt press comprising a first zone 3 m in length at about 220° C., a second zone of the same length at about 20° C. and a calender composed of two rolls exerting a pressure of 5 bar (0.5 MPa) on the assembly. The press nip was set at 16 mm.

The composite sheet was output continuously at a speed of 2 m/min and then cut up into panels.

The coating on the sheet thus obtained was of excellent quality: in particular, it had an attractive glossy appearance. This is explained by the fact that the foam continued to expand under the effect of the heat in the first zone of the belt and that the high pressure of the press enabled the coating layer to be properly consolidated.

EXAMPLE 8

The conditions used were those of example 2, but modified in that 745 g/m² wovens of glass yarns (60% by weight) preimpregnated with a thermosetting epoxy resin (40% by weight) taken to.the stage B of cure.

The double belt press was heated to 180° C. and operated at 1 m/min.

A sheet 1.5 mm in thickness, including a glossy uniform coating layer, white in color, was obtained.

EXAMPLE 9

Comparative Example

The conditions used were those of example 1, but modified in that the coating powder was deposited on the web of yarns in an amount of 390 g/m².

The coating on the composite sheet thus formed was not uniform and left a glimpse of the weft of the woven owing to transparency at several places.

What is claimed:

1. A process for manufacturing composite sheets, comprising the steps of:
   continuously depositing a web of continuous yarns on a moving substrate, the web comprising at least one first organic material and at least one reinforcing material;
   depositing a powder of a second organic material on at least one surface of said web;
   heating the web coated with the powder to a temperature sufficient to melt the powder into a smooth surface layer and melt said first organic material to form a matrix within which the reinforcing material is embedded;
   compressing and cooling the web to form a composite strip formed of said matrix embedded with said reinforcing material and said smooth surface layer positioned on an external surface thereof; and
   cutting the strip in the form of sheets or winding the strip on a rotating support.

2. The process as claimed in claim 1, wherein the powder is selected from the group consisting of particles of a thermoplastic material and particles of a thermosetting material.

3. The process as claimed in claim 2, wherein the thermoplastic material is selected from polyolefins, polyamides, polyesters and PVC.

4. The process as claimed in claim 2, wherein the thermosetting material is selected from epoxies, polyesters, polyurethanes and phenolic compounds.

5. The process as claimed in claim 2, wherein the web comprises between 20 and 90%, by weight of reinforcing material.

6. The process as claimed in claim 5, wherein the reinforcing material is glass, carbon or aramid.

7. The process as claimed in claim 6, wherein the web comprises at least 50% by weight of intermingled yarns of glass filaments and of filaments of a thermoplastic organic material capable of forming a matrix.

8. The process as claimed in claim 7, wherein the web is exclusively in the form of wovens or of continuous non-interlaced yarns.

9. The process as claimed in claim 8, wherein the powder is deposited on the web in an amount sufficient to produce a smooth surface layer with a thickness of between 0.3 and 1 mm.

10. The process as claimed in claim 1, wherein said web includes hybrid yarns formed of thermoplastic organic filaments and glass filaments.

11. The process of claim 1, wherein said composite strip has a width of approximately 1.5 meters.

12. A process for manufacturing composite sheets at least partly formed from intermingled yarns, comprising the steps of:
    continuously depositing a web of yarns, in the form of a mat of continuous yarns, the web being formed at least partly from intermingled yarns formed of filaments of a thermoplastic organic material and glass filaments intimately mixed;
    depositing on at least one side of said web a powder of an organic material having a film-forming capability in an amount sufficient to form a smooth surface under the action of heat;
    heating the web coated with the powder to a temperature high enough to convert the web of yarns into a matrix within which the glass filaments are embedded and to melt the powder into a topcoat having a smooth surface; and
    compressing and cooling the web to form a composite strip.

13. The process of claim 12, wherein the powder of an organic material has an opacity sufficient to make the glass filaments in the matrix invisible.

14. The process of claim 12, wherein the step of depositing a powder further comprises depositing a powder on both sides of said web.

15. The process of claim 12, wherein the intermingled yarns comprise a woven material.

16. The process of claim 12, wherein the topcoat has a thickness between 0.3-1 mm.

17. The process of claim 12, wherein the filaments of a thermoplastic organic material and the powder of an organic material comprise the same material.

18. The process of claim 17, wherein the filaments of a thermoplastic material and the powder of an organic material comprise polypropylene.

19. The process of claim 12, wherein the web is compressed with a force of about 5 kN to 50 kN per meter of width.

20. The process of claim 12, further comprising the step of preventing interpenetration of the topcoat and the matrix by introducing an intermediate layer there between.

21. A process for manufacturing composite sheets, comprising the steps of:
    continuously depositing a web of continuous yarns on a moving substrate, said web comprising at least one first organic material and at least one reinforcing material;
    depositing at least one intermediate structure on at least one surface of said web;
    depositing a powder of a second organic material on said intermediate structure;

heating said web to a temperature sufficient to melt said powder into a smooth surface layer and melt said first organic material to form a matrix within which said reinforcing material is embedded;

compressing and cooling said web to form a composite strip; and cutting the strip in the form of sheets or winding the strip on a rotating support.

22. The process as claimed in claim 21, wherein said at least one intermediate structure is selected from yarns or yarn assemblies, films, veils, sheets, panels and foams.

23. The process as claimed in claim 21, wherein said web includes hybrid yarns formed of thermoplastic organic filaments and glass filaments.

* * * * *